Jan. 2, 1962   R. C. McLANE ETAL   3,015,459
AUTOMATIC CONTROL APPARATUS
Filed Dec. 7, 1956   6 Sheets-Sheet 3

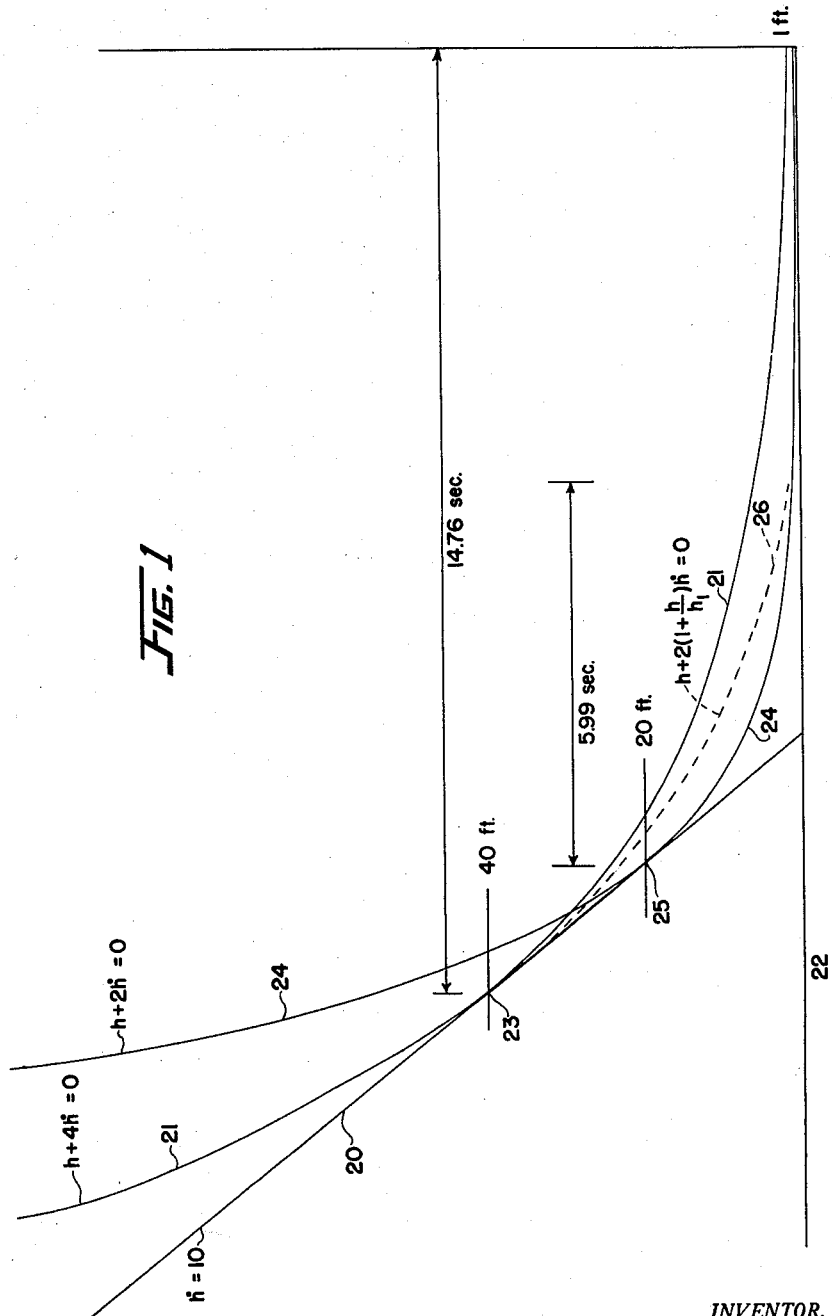

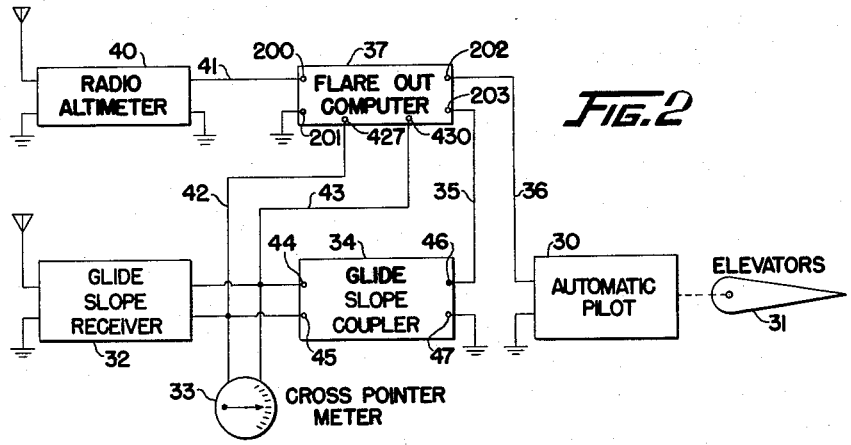
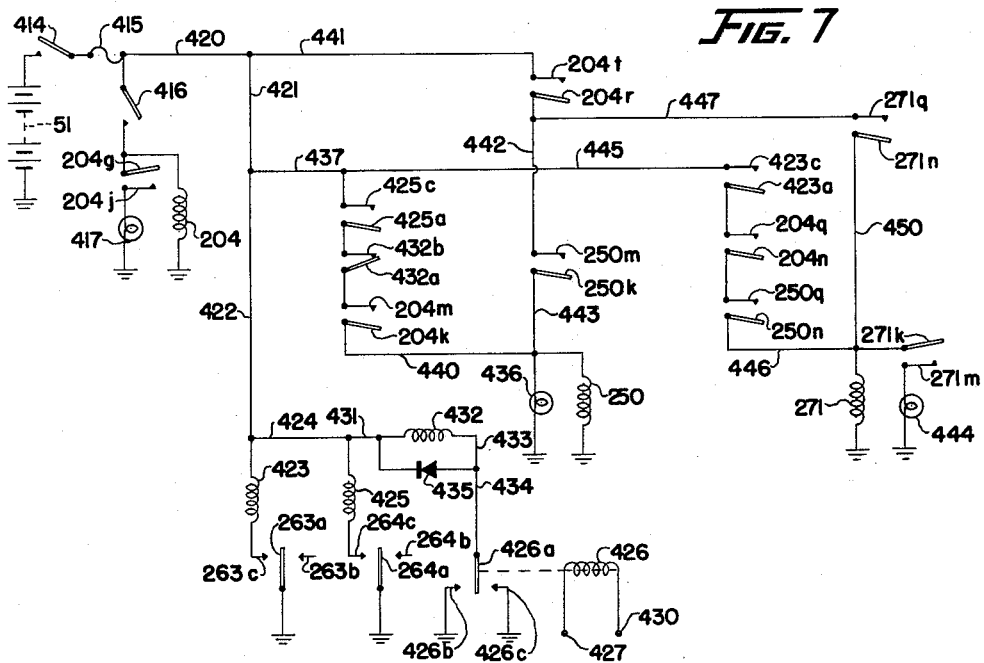

INVENTOR.
ROBERT C. MC LANE
ORVILLE R. POMEROY
BY
*George M Field*
ATTORNEY

INVENTOR.
ROBERT C. MC LANE
ORVILLE R. POMEROY
BY
ATTORNEY

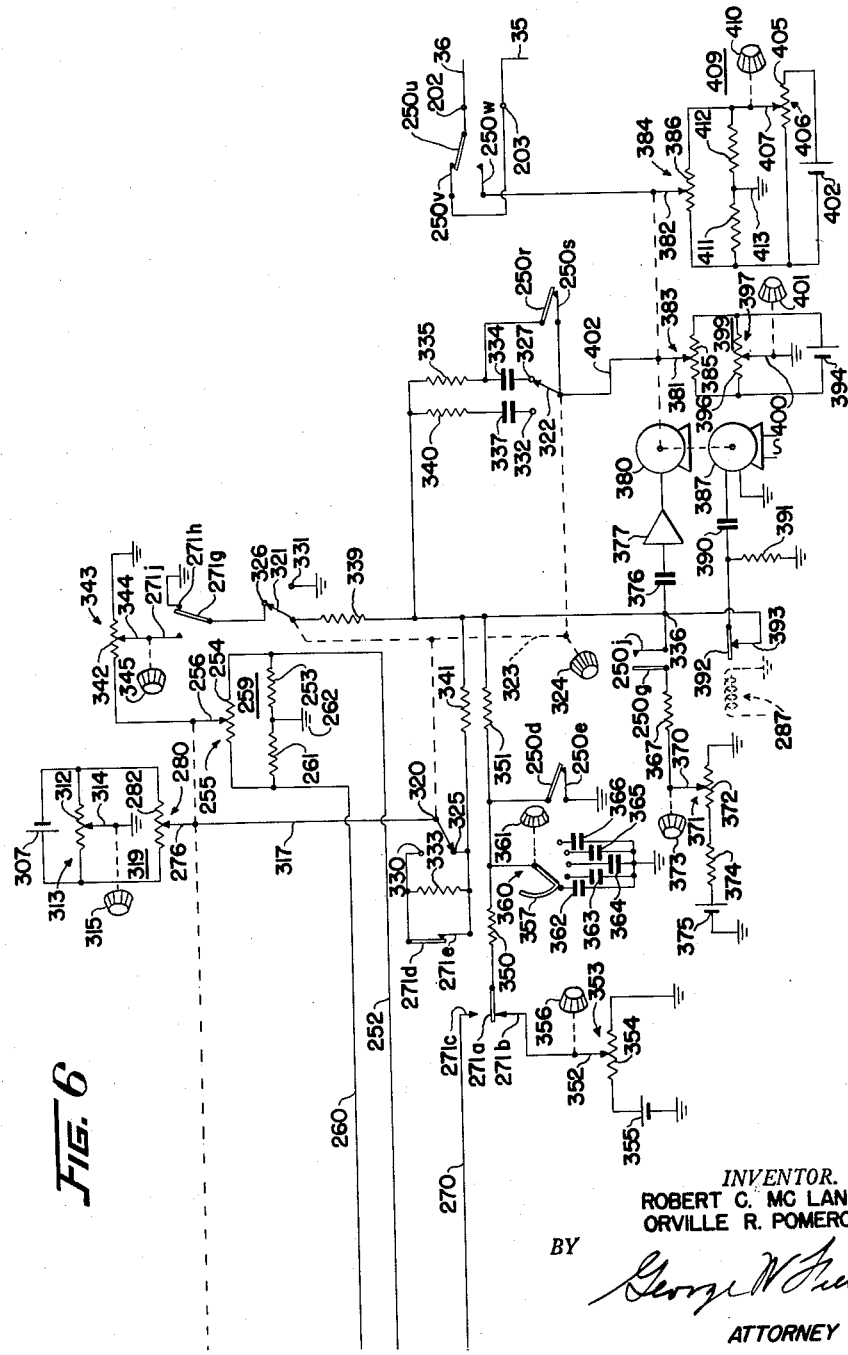

3,015,459
Patented Jan. 2, 1962

3,015,459
AUTOMATIC CONTROL APPARATUS

Robert C. McLane, St. Paul, and Orville R. Pomeroy, Minneapolis, Minn., assignors to Minneapolis-Honeywell Regulator Company, Minneapolis, Minn., a corporation of Delaware
Filed Dec. 7, 1956, Ser. No. 626,936
21 Claims. (Cl. 244—77)

This invention relates to the field of control apparatus, and more specifically to apparatus for controlling the movement of aircraft. A broad object of the invention is to provide a method and means for controlling a variable or condition in accordance with a quantity which includes at least a factor determined by the product of the value of the variable or condition multiplied by the rate of change thereof.

Another broad object of the invention is to provide an improved method and means for guiding the movement of an aircraft in elevation.

It is a general object of the invention to provide a new and improved method and apparatus for control of an aircraft in its approach to a datum, and more specifically for control of the aircraft in elevation in its approach to a landing field. A further specific object of the invention is to provide a three step landing procedure including an initial glide slope approach, an intermediate dead-reckoning interval, and a final computer-controlled flare-out, together with altitude responsive means for causing the several steps to follow one another, and further means for preventing this if the aircraft is initially too greatly displaced from the glide path beam.

Various other objects, advantages, and features of novelty not particularly enumerated above which characterize the invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which there is illustrated and described a preferred embodiment of the invention.

In the drawing,

FIGURE 1 is a diagram illustrative of the desired operation of the apparatus,

FIGURE 2 is a block diagram of a system for practicing the invention,

FIGURES 5 and 6 are a schematic wiring diagram of the signal portion of the flare-out computer, and FIGURE 7 is a wiring diagram of the switching portion of a flare-out computer.

Figure 3:
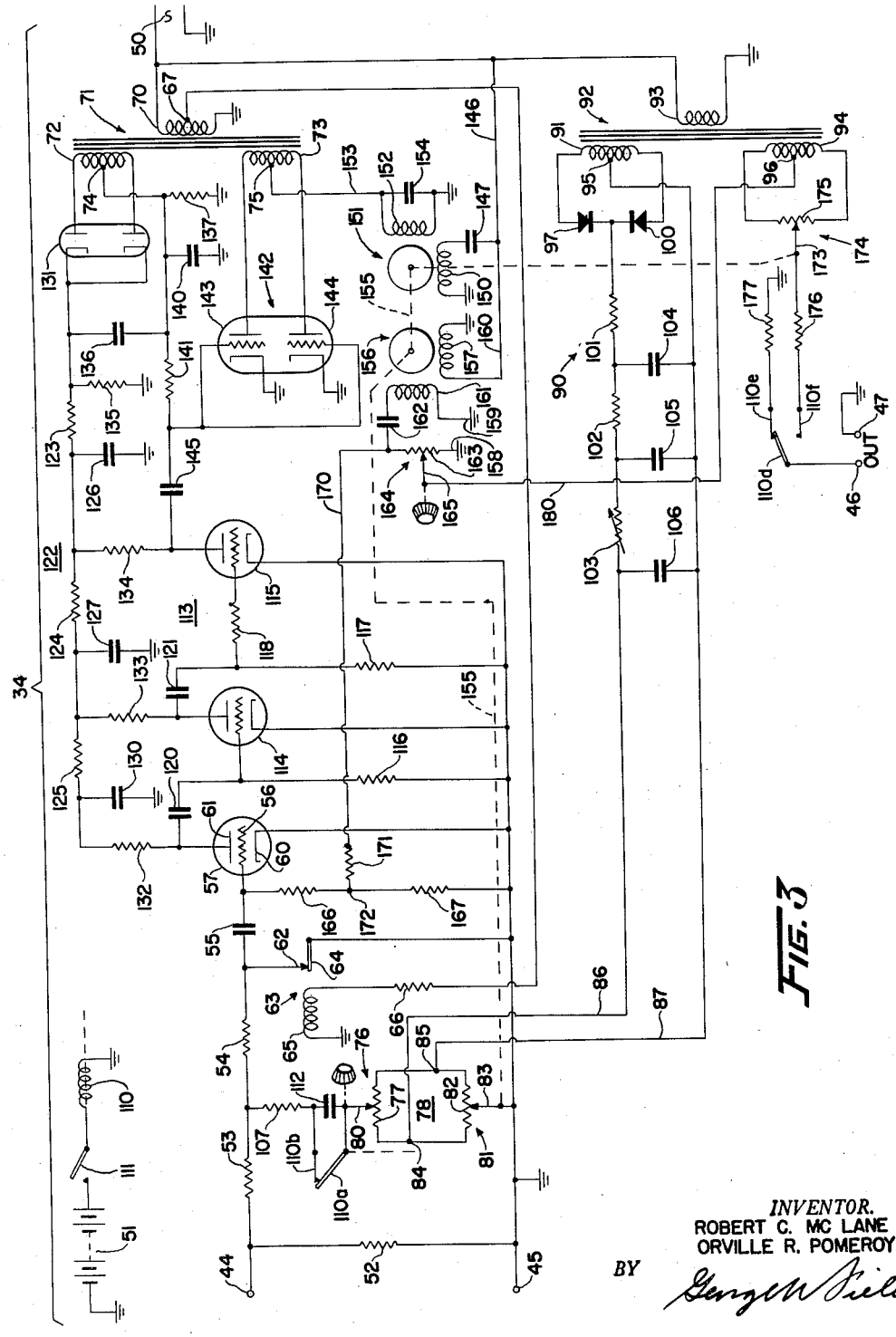
FIGURE 3 is a wiring diagram of a glide path coupler.

Reference should now be made to FIGURE 1, which gives a number of curves of altitude $h$ plotted against time. Curve 20 represents the path of an aircraft moving down a 2½° glide slope at an airspeed of 156 m.p.h., to have a rate of descent of 10 feet per second. An interval of slightly less than four seconds elapses between the instant when $h$ equals 40 feet and the instant when $h$ equals 1 foot, and slightly less than two seconds elapses between the instant when $h$ equals 20 feet and the instant when $h$ equals 1 foot.

Even at so low an angle as 2½° the impact of an aircraft with the ground is considerable, and in manually controlled flight the human pilot operates the elevators of the aircraft to still further decrease the angle of glide at the moment of touchdown. One purpose of the present invention is to provide means whereby this action of the human pilot may be performed automatically as a part of an automatic landing. The modification of the approach is referred to as flare-out: it has the desirable feature of making the touchdown less severe, and the disadvantage of reducing the length of runway available for runout after touchdown.

Curve 21 of FIGURE 1 represents the locus of a point moving according to the expression $$h + 4\dot{h} = 0 \qquad (1)$$

where $h$ is the displacement of the point from a datum represented by the line 22. It will be noticed that, interpreted in terms of altitude, curve 21 is initially much steeper than curve 20, but finally approaches line 22 asymptotically, at a much flatter angle.

As is shown in FIGURE 1, an aircraft moving along the curve 20 reaches a point 23 at which its altitude and rate of descent satisfy Equation 1, at an altitude of 40 feet, so that transfer of control of an aircraft from the straight glide path 20 to the exponential flare-out path 21 can be made at elevation 40 feet without any transient. The figure also shows that in following the curve 21 nearly fifteen seconds elapse between the instant when $h=40$ feet and the instant when $h=1$ foot.

Curve 24 represents the locus of a point moving according to the expression $$h + 2\dot{h} = 0 \qquad (2)$$

This curve is intially steeper than curve 22, and is finally flatter. An aircraft moving along the line 20 reaches a point 25 at which the altitude and rate of descent satisfy Equation 2 at an altitude of 20 feet, and here only eight seconds elapse between the instant when $h=40$ feet and the instant when $h=1$ foot.

If an aircraft is caused to follow the path 20, 23, 21, a flared out approach is made, but a great deal of runway is used up in 15 seconds. If the path 20, 25, 24 is followed, the runway economy results but the flare-out begins at such a low altitude that there is a tendency for pilots to distrust the equipment. We have discovered that the expression $$h + 2(1+h/h_1)\dot{h} \qquad (3)$$

where $h_1$ represents the altitude at which the transfer from curve 20 to a new curve takes place, defines a path having the early beginning of curve 21 and the short letdown interval of curve 24, thus combining the best features of both systems. Thus when $h=h_1$, Equation 3 is the same as Equation 1, while when $h=1$ the fraction becomes negligible, and Equation 3 is substantially the same as Equation 2. The locus of a point following Equation 3 is suggested by the broken curve 26 in FIGURE 1: it begins at point 23 and diverges from curve 21 until at $h=1$ the second term within the parentheses approaches 0 and curve 24 is very nearly reached.

FIGURE 2 shows the components embodying our invention. An automatic pilot 30 normally stabilizes the elevators 31 of an aircraft to maintain a pitch attitude of the aircraft which results in level flight for a particular power setting. A glide slope receiver 32 is shown as energizing a cross pointer meter 33, in the fashion conventional with ILS equipment, and also energizes a glide slope coupler 34. Coupler 34 normally supplies an overriding signal to automatic pilot 30 which is sufficient to cause the aircraft to follow the 2½° glide slope path, and this overriding signal is supplied through conductors 35 and 36 which are normally connected together in a flare-out computer 37.

A radio altimeter 40 is shown as supplying a signal at 41 to flare-out computer 37: this signal varies with the altitude of the aircraft above the landing field. When the altitude signal drops below a predetermined value, conductor 36 is disconnected from conductor 35 and is connected instead to receive the output of computer 37. As a refinement, conductors 42 and 43 are shown as further energizing computer 37 with the output of glide path receiver 32, to prevent the change-over from glide slope control of the automatic pilot unless the aircraft is within a selected distance from the beam center.

Receiver 32 and meter 33 are not shown in any greater detail, since they are commercially available and well known devices, and no further detail is given as to automatic pilot 30 and its connection to elevators 31 for a similar reason—many such arrangements are known and any one can be used at the choice of the designer.

Glide slope coupler 34 may not be so well known, and its construction is given herein more detail for the sake of completeness. Referring to FIGURE 3, the coupler input terminals are shown at 44 and 45 and its output terminals are shown at 46 and 47, the latter being grounded. Alternating voltage is supplied to the coupler at 50, and direct voltage at the standard aircraft level of 28 volts is supplied at 51. It will be understood that coupler 34 is a portion of a more complete installation which in practice includes a localizer receiver and localizer coupler as well, and that the glide path coupler is disclosed in somewhat simplified form, especially as to control circuitry and its interconnection with that of the localizer coupler.

As shown in FIGURE 3, terminal 45 is grounded, and an input resistor 52 is shunted across terminals 44 and 45. The former terminal is connected through resistors 53 and 54 and a capacitor 55 to the grid 56 of a triode 57 having a cathode 60 and an anode 61.

Connected to the conductor joining resistor 54 and capacitor 55 is the fixed contact 62 of a vibrator 63 whose movable contact 64 is maintained in vibration by energization of a coil 65, through a resistor 66, from a tap 67 on the primary winding 70 of a transformer 71, which has a plurality of secondary windings 72 and 73 which are center tapped at 74 and 75 respectively. Primary winding 70 is energized with alternating voltage from source 50.

Also shown in the drawing is a Wheatstone bridge 78 made up of a first voltage divider 76 having a winding 77 and a slider 80 and a second voltage divider 81 having a winding 82 and a slider 83. Sliders 80 and 83 comprise the output terminals of bridge 78: its input terminals 84 and 85 are energized with direct voltage on conductors 86 and 87 from a power supply 90 energized in turn from secondary winding 91 of a transformer 92 having a primary winding 93 energized from source 50, and a further secondary winding 94. The secondary windings are center tapped at 95 and 96, respectively. Power supply 90 is shown to comprise rectifiers 97 and 100, resistors 101, 102 and 103 and filter capacitors 104, 105, and 106.

The output of bridge 78 is normally connected from ground to the common point between resistors 53 and 54 by a circuit including a resistor 107 and the normally closed contacts 110a and 110b of a relay 110, which is energized from source 51 when a glide path switch 111 is closed to initiate control of the aircraft in elevation in accordance with the output from glide path receiver 32. Operation of relay 110 opens contacts 110a and 110b, inserting a capacitor 112 in series in the output circuit of bridge 78, and thus converting the coupler from a simple follow-up device to an integrating or reset arrangement.

Triode 57 comprises the first stage of a three stage voltage amplifier 113 which includes further triodes 114 and 115 having grid resistors 116 and 117 and coupling capacitors 120 and 121. The voltage amplifier tubes are energized through a graded filter 122, including resistors 123, 124, and 125 and capacitors 126, 127 and 130, from a full wave rectifier 131 connected to secondary winding 72 of transformer 71, the plate resistors of the triodes being indicated at 132, 133 and 134. The rectifier circuit includes a bleeder resistor 135 and an input capacitor 136, and a further resistor 137, shunted by a capacitor 140, is provided to supply bias through a resistor 141 for the grids of a discriminator 142 made up of a pair of triodes 143 and 144 whose plate energization is derived from winding 73 of transformer 71. The discriminator is connected to the output of voltage amplifier 113 by coupling capacitor 145.

Energized from alternating voltage source 50 through conductor 146 and phasing capacitor 147 is the line phase winding 150 of a motor 151 having an amplifier phase winding 152, connected to center tap 75 of a secondary winding 73 through conductor 153, and shunted by a capacitor 154. The shaft 155 of motor 151 also operates the rotor of a velocity generator or dynamic transformer 156, whose primary winding 157 is energized from source 50 through conductors 146 and 160, and whose secondary winding 161 energizes, through a phasing capacitor 162, the winding 163 of a voltage divider 164 having a slider 165, the energizing circuit being completed through ground connections 158 and 159. The grid resistance of triode 57 is made up of a pair of resistors 166 and 167 in series. The voltage across winding 163 is also impressed, through conductor 170 and an isolating resistor 171, on the common point 172 between resistors 166 and 167, and thus appears on the grid of triode 57.

Shaft 155 of motor 151 is extended to operate slider 83 of voltage divider 81, and is further extended to actuate the slider 173 of a voltage divider 174 having a winding 175 energized from secondary winding 94 of transformer 92. Slider 173 is connected through an isolating resistor 176 to the fixed relay contact 110f: fixed relay contact 110e is grounded through a resistor 177. Output terminal 46 is connected to movable relay contact 110d, and output terminal 47 is grounded.

Operation of coupler 34 is as follows. Whenever glide slope receiver 32 gives an output, crosspointer meter 33 gives an indication, and a unidirectional voltage appears between terminals 44 and 45 of FIGURE 3. This voltage is converted to A.C. by vibrator 63, and amplified in voltage amplifier 113. Discriminator 142 energizes motor 151 for operation in one direction or the other, depending upon the polarity of the voltage supplied at input terminals 44 and 45, and shaft 155 adjusts slider 83 until the bridge output voltage appearing across resistor 53 is equal and opposite to the input voltage. When this takes place, the input to voltage amplifier 113 is reduced to zero, and operation of motor 151 ceases. Slider 173 has been displaced from a central position, however, and a voltage appears on relay contact 110f which is determined in amplitude and phase by the magnitude and polarity of the input voltage on terminals 44 and 45.

While motor 151 is operating, velocity generator 156 is supplying an output voltage on secondary winding 161 which varies in magnitude with the speed of operation of the motor, and which reverses in phase with reversal in the direction of operation of the motor. This output voltage is supplied through resistor 171 to act as a bias for the first triode 57 of the voltage amplifier, and a portion thereof is also supplied on slider 165 of voltage divider 164. An output circuit may be traced from fixed contact 110f through resistor 176, slider 173, center tap 96, conductor 180, slider 165, and the portion of winding 163 below the slider to ground, but since the relay 110 is not actuated this output is not supplied to output terminal 46. The latter is grounded instead through relay contact 110d and 110e and resistor 177.

When glide path control of the aircraft is desierd, switch 111 is closed, energizing relay 110, which acts to open contacts 110a and 110b inserting capacitor 107 in the bridge output circuit, and to move contact 110d out of engagement with contacts 110e and into engagement with contact 110f, supplying the voltage on fixed contact 110f at output terminal 46. Now any change which takes place in the signal on terminals 44 and 45 is balanced at the input to amplifier 113 not by the bridge output voltage itself, but by the rate of change thereof. This is appropriate because the switch 111 is closed at a time when the signal on terminals 44 and 45 is zero, and for a system in proper operation no permanent signal of either sense appears on the input terminals. The provision of the rate taking capacitor 112 in the rebalance circuit of the coupler gives the coupler integrating or reset characteristics, and has been found in practice to produce very satisfactory beam following.

In one form of the invention the following values were found to be satisfactory.

| | |
|---|---|
| Resistor 52 | 1K |
| Resistor 53 | 61K |
| Resistor 54 | 51K |
| Resistor 66 ohms | 25 |
| Resistor 77 | 5K |
| Resistor 82 ohms | 855 |
| Resistor 101 do | 160 |
| Resistor 102 do | 160 |
| Resistor 103 | 3.5K |
| Resistor 107 | 1M |
| Resistor 116 | 1M |
| Resistor 117 | 1M |
| Resistor 118 | 100K |
| Resistor 123 | 22K |
| Resistor 124 | 22K |
| Resistor 125 | 100K |
| Resistor 132 | 470K |
| Resistor 133 | 470K |
| Resistor 134 | 470K |
| Resistor 135 | 100K |
| Resistor 137 | 5.1K |
| Resistor 141 | 1M |
| Resistor 163 | 1K |
| Resistor 166 | 1M |
| Resistor 167 ohms | 47 |
| Resistor 171 | 1K |
| Resistor 175 ohms | 100 |
| Resistor 176 do | 56 |
| Resistor 177 do | 390 |
| Capacitor 55 mfd | .047 |
| Capacitor 104 mfd | 10 |
| Capacitor 105 mfd | 10 |
| Capacitor 106 mfd | 10 |
| Capacitor 112 mfd | 10 |
| Capacitor 120 mfd | .047 |
| Capacitor 121 mfd | .047 |
| Capacitor 126 mfd | .22 |
| Capacitor 127 mfd | .22 |
| Capacitor 130 mfd | .66 |
| Capacitor 136 mfd | 10 |
| Capacitor 140 mfd | .22 |
| Capacitor 145 mfd | .047 |
| Capacitor 147 mfd | .22 |
| Capacitor 154 mfd | .22 |
| Capacitor 162 mfd | .25 |

Alternating voltage supply, 115 volts, 400 cycles.
D.C. supply 28 volts.
Rectifiers 88 and 89, CR101.

Figure 5:
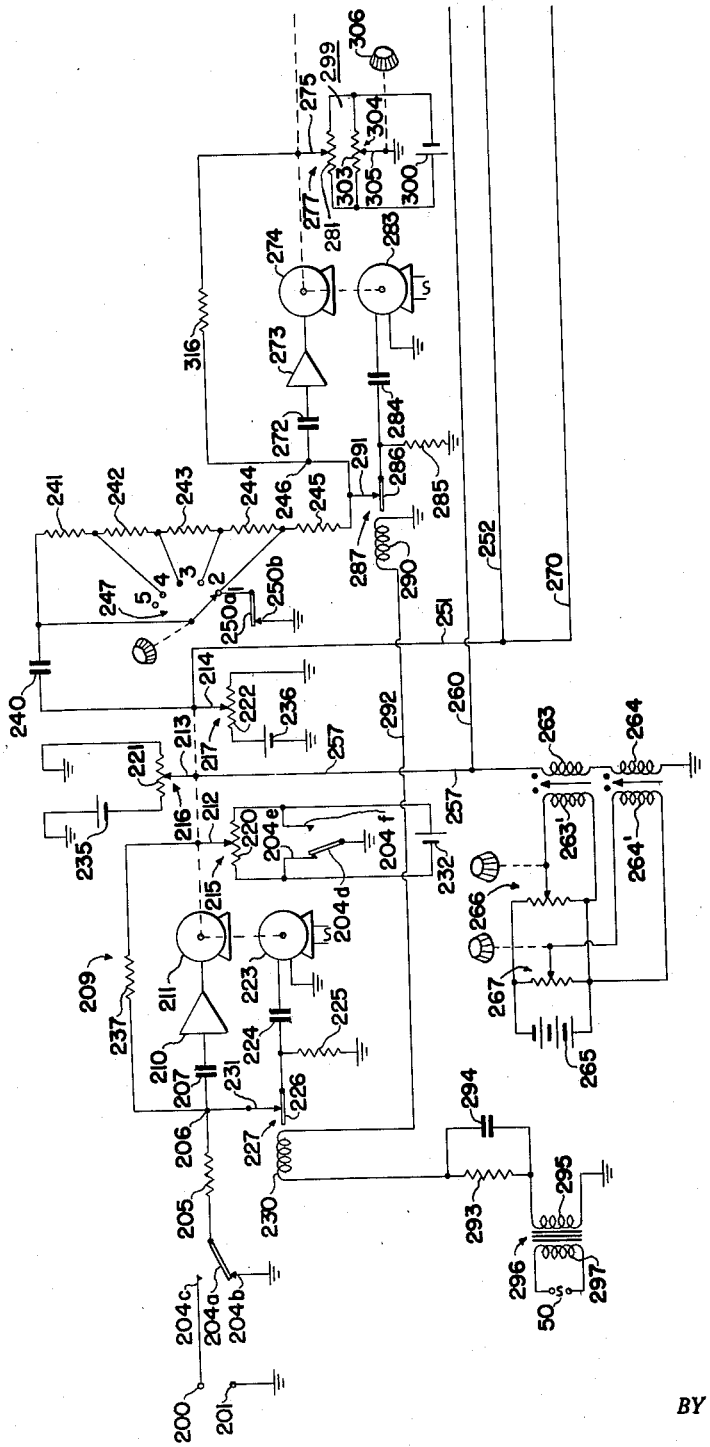

Reference should now be made to FIGURE 5 and 6 where flare-out computer 37 is shown as having a pair of signal terminals 200 and 201 and a pair of output terminals 202 and 203. Alternating voltage is supplied to the computer from source 50, and a number of D.C. sources, which are shown in the figure as separate batteries, may conveniently be elements of a composite power supply energized from source 50 of a conventional nature. FIGURES 5 and 6 must be considered in connection with FIGURE 7, since the former show a number of sensitive relay contacts for which the control windings and the related circuitry are shown in FIGURE 7. For convenience and description, each relay will be identified by the number of its winding, and the various movable and fixed contacts of the relays will be identified by the same reference numeral with suffix letters.

Input terminal 201 is grounded. Input terminal 200 is connected to fixed relay contact 204c. Fixed relay contact 204b is grounded, and movable relay contact 204a is connected through a resistor 205 to a summation point 206 which in turn is connected through a capacitor 207 to a motor control amplifier 210. A motor 211 is energized from amplifier 210, and is connected to adjust the sliders 212, 213, and 214 of a plurality of voltage dividers 215, 216, and 217 having windings 220, 221 and 222, all respectively. Motor 211 also drives a velocity generator 223 whose output is impressed through a capacitor 224 across a resistor 225. The common terminal between capacitor 224 and resistor 225 is connected to the blade 226 of a vibrator 227 having a coil 230 and a fixed contact 231 connected to summation point 206. When the coil is de-energized contacts 226 and 231 are in engagement. When the coil is energized, contacts 226 and 231 engage and disengage at the frequency of the source energizing the coil.

The ends of winding 220 of voltage divider 215 are maintained at opposite polarities by suitable means shown as a battery 232, and are connected to fixed relay contacts 204e and 204f. Movable relay contact 204d is grounded.

One end of winding 221 is grounded. The other end is conected to the negative terminal of a battery 235 whose positive terminal is grounded.

One end of winding 222 is grounded. The other end is connected to the positive terminal of a battery 236 whose negative terminal is grounded.

Slider 212 is connected to summation point 206 through resistor 237. Slider 214 is connected through a differentiating capacitor 240 and a plurality of resistors 241, 242, 243, 244 and 245, connected in series, to a summation point 246. By means of a multiposition switch 247 one or more of resistors 241, 242, 243 and 244 may be shorted out, to vary the time constant of the circuit including the capacitor 240. The common point between resistors 244 and 245 is connected to movable relay contact 250a which normally engages a grounded fixed relay contact 250b. Slider 214 is further connected through conductors 251 and 270 to a fixed relay contact 271c.

Slider 214 is also connected, through conductors 251 and 252, to a resistor 253 and to one end of the winding 254 of a voltage divider 255 having a slider 256. Slider 213 is connected, through conductors 257 and 260, to a resistor 261 and to the other end of winding 254. Resistors 253 and 261 are grounded at 261. Members 254, 261, and 253 constitute an electrical bridge 259.

Slider 213 is further connected to ground through a series circuit including the windings 263 and 264 of a pair of balanced relays. A second relay winding 263' is energized from a source 265 through a voltage divider 266, and a second relay winding 264' is energized from source 265 through a voltage divider 267.

As shown in FIGURES 5 and 7, each of these balanced relays comprises a pair of coils, a pair of fixed contacts, and a movable contact which does not engage either fixed contact when the two coils are energized equally, or when they are both de-energized. If the coils are energized unequally, the movable contact engages one fixed contact or the other depending upon the sense of the inequality of the electrical energization. By suitably adjusting voltage dividers 266 and 267 it is possible to determine two different values of voltage on slider 213 at which the two balanced relays operate in succession.

As shown in FIGURES 5 and 6, summation point 246 is connected through a capacitor 272 to a motor control amplifier 273. Amplifier 273 controls the operation of a motor 274 which drives the slider 256 of the voltage divider 255, and also the sliders 275 and 276 of a pair of further voltage dividers 277 and 280 having windings 281 and 282 respectively. Motor 274 also drives a velocity generator 283, whose secondary winding supplies an output through a capacitor 284 to a resistor 285. The common point between resistor 285 and capacitor 284 is connected to the movable contact 286 of a vibrator 287 having a coil 290 which actuates movable contact 286 out of engagement with a fixed contact 291: in the de-energized condition of winding 290 the movable and fixed contacts are in engagement. Contact 291 is connected to summation point 246.

The vibrator coils 230 and 290 are connected in series by a conductor 292, and are energized through a resistor 293 and a shunting capacitor 294 from the secondary winding 295 of a transformer 296 whose primary winding 297 is energized with alternating voltage from source 50.

The ends of winding 281 are maintained at opposite polarities by a battery 300. Also energized from battery 300 is the winding 303 of a further voltage divider 304 whose slider 305 is adjustable by means of a manual knob 306, and is grounded. Slider 275 is connected to summation point 246 through a resistor 316. Members 277 and 304 constitute an electric bridge 299.

In a similar fashion the ends of winding 282 are maintained at opposite potentials by a voltage source 307. Also energized from source 307 is the winding 312 of a voltage divider 313 whose slider 314 is adjustable by means of a manual knob 315, and is grounded. Members 280 and 313 constitute an electric bridge 319.

Slider 276 is connected by a conductor 317 to a first movable contact 320 of a three pole, two position switch having further movable contacts 321 and 322 and actuated through a mechanical connection 323 by a manual knob 324. The switch has fixed contacts 325, 326, and 327 shown as engaged by the movable contacts, and further fixed contacts 330, 331, 332 into engagement with which the movable contacts may be operated. A resistor 333 is connected between contacts 325 and 330 and is shunted by relay contacts 271d and 271e. Fixed contact 331 is grounded. Fixed contact 327 is connected through a capacitor 334 and a resistor 335 to a summation point 336: movable contact 321 is connected to summation point 336 through a resistor 339. Fixed contact 332 is connected to summation point 336 through a capacitor 337 and resistor 340. Contact 325 is connected to summation point 336 through a summing resistor 341.

Slider 256 is connected to energize the winding 342 of voltage divider 343 whose slider 344 is connected to relay contact 271j, and is arranged for adjustment by a manual knob 345. Relay contact 271h is grounded. Movable switch contact 322 is connected to relay contact 250s. Relay contact 250r is connected to the common point between resistor 335 and capacitor 334, so that the latter may be short circuited.

Relay contact 271a is connected to junction point 336 through resistors 350 and 351. Relay contact 271b is connected to the slider 352 of a voltage divider 353 having a winding 354: slider 352 is arranged for actuation by a manual knob 356. One end of winding 354 is grounded: the other is connected to the positive terminal of a battery 355 whose negative terminal is grounded. The common connection between resistors 350 and 351 is connected to relay contact 250d: relay contact 250e is grounded. The common terminal between resistors 350 and 351 is also connected to the movable contact 357 of a switch 360 which is actuable by means of a manual knob 361. Switch 360 operates to connect one or more of a plurality of capacitors 362, 363, 364, 365, and 366, in parallel, from resistors 350 and 351 to ground.

Summing point 336 is also connected to relay contact 250j: relay contact 250g is connected through a resistor 367 to the slider 370 of a voltage divider 371 having a winding 372. Slider 370 is connected for actuation by a manual knob 373. One end of winding 372 is grounded: the other end is energized through a resistor 374 from the positive terminal of a battery 375 of which the negative terminal is grounded.

Summation point 336 is connected through a coupling capacitor 376 to a motor control amplifier 377. Amplifier 377 controls energization of a motor 380 which positions the sliders 381 and 382 of a pair of voltage dividers 383 and 384 having windings 385 and 386. Motor 380 also drives a velocity generator 387: the output of velocity generator 387 is impressed through a capacitor 390 across a resistor 391. The common point between resistor 391 and condensor 390 is connected to a second movable contact 392 of vibrator 287: the associated fixed contact 393 is connected to summation point 336.

The ends of winding 385 are maintained at opposite potentials by a battery 394. This battery also energizes the winding 396 of a further voltage divider 397 having a grounded slider 400 adjustable by a manual knob 401. Slider 381 is connected to switch arm 322 by conductor 402. Members 383 and 397 constitute an electric bridge 399.

The terminals of winding 386 are maintained at opposite potentials by a battery 402. The battery energizes the winding 405 of a voltage divider 406 whose slider 407 is adjustable by a manual knob 410 to vary the energization of winding 386. Shunted across winding 386 are a pair of resistors 411 and 412 having a grounded common connection 413. Members 384, 411, and 412 constitute an electric bridge 409.

Slider 382 is connected to relay contact 250w. Relay contact 250v is connected to output terminal 203, and relay contact 250u is connected to output terminal 202.

The switching circuit for flare-out computer 37 is shown in FIGURE 7 to be energized from D.C. source 51 through a power switch 414 and a fuse 415. A master switch 416 is shown as being operable to energize the winding of relay 204, and to make possible the illumination of a first pilot lamp 417 when relay contacts 204g and 204j engage.

When relay contacts 263a and 263c of balanced relay 263 engage, a circuit may be traced from fuse 415 through conductors 420, 421 and 422 to the winding 423 of a further relay whose contacts 423a and 423c also appear in FIGURE 7.

When balanced relay contacts 264a and 264c engage, a circuit may be traced from fuse 415 through conductors 420, 421, 422 and 424 and the winding of a relay 425 whose contacts 425a and 425c appear in FIGURE 7.

FIGURE 7 also shows a meter type relay 426 which actuates a movable contact 426a into engagement with either of two fixed contacts 426b and 426c, according as the energization of relay 426 exceeds a predetermined value in either sense. Relay 426 is energized at terminals 427 and 430: as shown in FIGURE 2 these terminals are connected to the output of glide slope receiver 32, so that whenever the craft is displaced from the desired glide slope by more than a predetermined amount, relay 426 closes a circuit from movable contact 426a to ground. When this happens a circuit may be traced from fuse 415 through conductors 420, 421, 422, 424 and 431, relay winding 432, and conductors 433 and 434, movable contact 426a and one of fixed contacts 426b and 426c to ground, thus energizing relay 432. The contacts 432a and 432b of this relay appear in FIGURE 7. A rectifier 435 is connected across winding 432 to absorb inductive surges when the contacts of relay 426 open.

A pilot lamp 436 is connected in parallel with relay winding 250. These components can be energized from fuse 415 through either of two circuits. The first circuit may be completed through conductors 420, 421 and 437, relay contacts 425c and 425a, relay contacts 432b and 432a, relay contacts 204m and 204k, and conductor 440. The second circuit may be completed through conductors 420 and 441, relay contacts 204t and 204r, conductor 442, relay contacts 250m and 250k, and conductor 443.

A pilot lamp 444 may be connected in parallel with relay winding 271 by relay contacts 271k and 271m. These elements can be energized through either of two circuits. The first circuit may be completed from fuse 415 through conductors 420, 421, 437, and 445, relay contacts 423c, and 423a, relay contacts 204q and 204n, relay contacts 250q and 250n and conductor 446. The second circuit may be traced from fuse 415 through conductors 420 and 441, relay contacts 204t and 204r, conductor 447, relay contacts 271q and 271n, and conductor 450.

In one successful embodiment of the flare-out coupler the following values were used.

| Component | Value |
|---|---|
| Resistor 205 | 1M |
| Resistor 225 ohms | 510 |
| Resistor 237 | 5M |
| Resistor 241 | 2M |
| Resistor 242 | 1M |
| Resistor 243 | .5M |
| Resistor 244 | 250K |
| Resistor 245 | 250K |
| Resistor 253 | 5K |
| Resistor 261 | 5K |
| Resistor 285 ohms | 510 |
| Resistor 293 do | 125 |
| Resistor 316 | 1M |
| Resistor 333 | .5M |
| Resistor 335 | 300K |
| Resistor 339 | .5M |
| Resistor 340 | 400K |
| Resistor 341 | .5M |
| Resistor 350 | .5M |
| Resistor 351 | .5M |
| Resistor 367 | 1M |
| Resistor 374 | 45K |
| Resistor 391 ohms | 510 |
| Resistor 411 do | 200 |
| Resistor 412 do | 200 |
| Capacitor 207 mfd | .01 |
| Capacitor 224 mfd | .25 |
| Capacitor 240 mfd | 1 |
| Capacitor 272 mfd | .01 |
| Capacitor 284 mfd | .25 |
| Capacitor 294 mfd | 2 |
| Capacitor 334 mfd | 5 |
| Capacitor 337 mfd | 2.5 |
| Capacitor 362 mfd | 1 |
| Capacitor 363 mfd | 1 |
| Capacitor 364 mfd | 2 |
| Capacitor 366 mfd | 7 |
| Capacitor 376 mfd | .01 |
| Capacitor 390 mfd | .25 |
| Winding 220 ohms | 4200 |
| Winding 221 do | 1030 |
| Winding 222 do | 1030 |
| Winding 254 | 22K |
| Winding 266 | 1K |
| Winding 267 | 1K |
| Winding 281 ohms | 4500 |
| Winding 282 do | 1020 |
| Winding 303 | 5K |
| Winding 312 | 5K |
| Winding 342 | 100K |
| Winding 354 | 40K |
| Winding 372 | 5K |
| Winding 385 | 4.5K |
| Winding 386 ohms | 365 |
| Winding 396 | 5K |
| Winding 405 | 1K |
| Voltage 232 v | 33 |
| Voltage 235 v | 33 |
| Voltage 236 v | 33 |
| Voltage 265 v | 33 |
| Voltage 295 v (A.C.) | 6.3 |
| Voltage 300 v | 8.6 |
| Voltage 307 v | 17.2 |
| Voltage 355 v | 33 |
| Voltage 375 v | 33 |
| Voltage 394 v | 33 |
| Voltage 402 v | 5 |
| Rectifier 435 | 1N34A |

Before describing operation of the flare-out computer, the overall landing procedure will be discussed in more detail. It is of course understood that control in azimuth by a localizer receiver and coupler or equivalent apparatus is provided. When the aircraft enters the glide slope beam the glide slope coupler is put into operation, as described in connection with FIGURES 3 and 4 under the aircraft proceeds down the glide slope path under the control of the glide slope coupler. For a given air speed this means a fixed rate of descent, unless the aircraft departs from the path.

It is desired to change over from radio responsive, straight line control, to altitude responsive, flared out control. This change-over must take place at such a low altitude that any improper operation of the altitude responsive equipment would be extremely dangerous. Accordingly it has been considered desirable to introduce a "dead reckoning period" between the glide path control and the flared out control. This dead reckoning period uses altitude data to compute a straight path which is a continuation of the glide slope, and is begun at such an altitude that improper operation of the altitude responsive equipment becomes evident to the human pilot soon enough for him to take appropriate corrective measures. Since the dead reckoning period makes use of most of the flare-out apparatus, much greater assurance of safe operation of the apparatus is given.

The initial condition of flare-out coupler 37 is as follows. Relays 204, 250, 271, 423, 425, and 432 are de-energized, and their contacts are as shown in FIGURES 5, 6, and 7. Balanced relays 263 and 264 are de-energized and make no contact in either sense. Relay 426 is energized with the glide slope receiver output and may be completing either ground circuit, or neither, depending upon the magnitude of the output.

To set the computer in operation alternating voltage is supplied by source 50: this causes operation of vibrators 227 and 287, and energizes the primary windings of velocity generators 223, 283 and 387. Batteries 232, 235, 236, 265, 300, 307, 355, 375, 394, and 402 are connected, or the equivalent voltages are supplied in conventional fashion from source 50. Switches 320, 321, and 322 are in the positions shown. Slider 407 is at some position which has been found to give satisfactory operation of the equipment.

Since resistor 205 is grounded, there is no input to amplifier 210 except the rebalance signal through resistor 237, and the antihunt signal from velocity generator 223. By the engagement of relay contacts 204d and 204e winding 220 is grounded at its left hand end, and motor 211 runs until slider 212 is at the left hand end of winding 220. The input to amplifier 210 is now zero and motor 211 stops. Sliders 213 and 214 are now at the left hands of their windings, and are supply maximum outputs. A maximum voltage appears between conductors 252 and 260 and hence across winding 254 of voltage divider 255, and maximum current flows through the sensing windings of relays 263 and 264. The standard windings 263' and 264' of these relays are energized, in accordance with the settings of voltage dividers 266 and 267, at lower levels, as will be explained below, so that contacts 263a and 264a are in engagement with contacts 263b and 264b, and no circuits are completed.

The left hand plate of capacitor 240 is connected to slider 214, and the right hand plate is grounded, either directly or through one or more of resistors 241–244 according to the setting of switch 247, through relay contacts 250a and 250b. Accordingly the capacitor is charged to a maximum value, presetting the rate circuit to the condition which is expected to prevail when the system is put into full operation.

Relay contacts 250a and 250b also ground the input to amplifier 273 through resistor 245, so that the only inputs to the amplifier are the rebalance signal through resistor 316 and the antihunt signal from velocity generator 283. Motor 274 runs until slider 275 is at a position which balances bridge 299: the balance point is set, by adjustment of slider 305 using knob 306, to occur when slider 256 is at zero potential with respect to ground potential 262, that is, when bridge 259 is balanced. Slider 276 has been positioned by motor 274 simultaneously with sliders 275 and 256, and slider 314 is now adjusted, by knob 315, to balance bridge 319, thus reducing the voltage on slider 276 to zero, and no input is supplied through resistor 341 to summation point 336. No inputs are supplied to summation point 336 through resistors 339, 351 and 367 because of the grounding action of relay contacts 271g and 271h and relay contacts 250d and 250e, and because of the interrupting action of relay contacts 250g and 250j, all respectively. Accordingly the only inputs to amplifier 377 are the antihunt signal from velocity generator 387 and the rebalance signal from slider 381 through relay contacts 250s and 250r and resistor 335. Motor 380 runs until slider 381 reaches a position which balances bridge 399: the balance point is set, by adjusting slider 400 by knob 401, to occur when the voltage between slider 382 and ground connection 413 is that required in automatic pilot 30 to bring about change in the pitch attitude of the aircraft sufficient at landing speed to cause the aircraft to descend at an angle of 2½°.

The next step is to close switch 414, FIGURE 7. If the aircraft is within a predetermined distance from the center of the beam no change results, but if the aircraft is further from the beam than the predetermined distance relay 426 is completing the circuit for relay 432 through contact 426b or contact 426c, and relay 432 pulls in, opening at contacts 432a and 432b the operating circuit for relay 250. When the aircraft returns sufficiently closely to the beam, relay 426 opens its contacts, relay 432 is de-energized, and contacts 432a and 432b again close.

This is the standby condition of the apparatus. It prevails during most of the glide slope approach, until the craft is at an altitude within the range of the altitude servo system 209. In one embodiment of the invention this was 200 feet. When the aircraft is within 200 feet of the ground, therefore, switch 416, FIGURE 7, may be closed, energizing the winding of relay 204, which pulls in. Contacts 204a, 204b, and 204c, FIGURE 5, unground the input to amplifier 210 and supply thereto the positive altitude signal at terminal 200. Relay contacts 204d, 204e, and 204f unground the negative left hand terminal of winding 220 and instead ground the positive right hand terminal so that a maximum negative signal is supplied through resistor 237 to amplifier 210. Since switch 416 is closed at a time when the altitude of the aircraft supplies through resistor 205 a signal which is equal to the maximum available through resistor 237, no operation of motor 211 takes place. Relay contacts 204g and 204j, FIGURE 7, close to light signal lamp 417. Relay contacts 204k and 204m close to complete a preparatory circuit for the operation of relay 250, relay contacts 204n and 204q close to complete a preparatory circuit for the operation of relay 271, and relay contacts 204r and 204t close to complete the preparatory circuit for holding circuits of relays 250 and 271.

At this time relay contacts 250u and 250v, FIGURE 6, are completing the circuit from conductor 35 to conductor 36 so the control of the aircraft is in accordance with the signal from the glide path coupler, and the aircraft is descending along the 2½° glide slope: if it departs from the glide slope too greatly, relays 426 and 432 are still operative to prevent operation of relay 250 until a return to the glide slope is achieved.

As the aircraft moves along the glide slope its altitude decreases, and hence the signal also decreases to amplifier 210 from terminal 200. Motor 211 operates to reduce the signal to amplifier 210 through resistor 237, and at the same time sliders 213 and 214 are displaced from the ends of their windings. Decrease in the voltage on slider 213 results in decreasing energization of relay windings 263 and 264. Slider 266 is set so that its energization of winding 263' is the same as that of winding 263 when the altitude of the craft is 40 feet, and slider 267 is set so that its energization of winding 264' is the same as that of winding 264 when the altitude of the craft is 100 feet.

Decrease in the voltage on slider 214 decreases the charge on capacitor 240, but discharge of the latter must take place through one or more of resistors 241–244, except in the number 1 position of switch 247, so that the voltage across the capacitor lags that from slider 214 to ground by an amount which is determined by the setting of switch 247, and which is proportional to the rate of descent $\dot{h}$, the setting of switch 247 determining the coefficient of proportionality. The aircraft is now following the glide slope, and motor 211 is following the actual altitude of the aircraft which should be decreasing at a constant rate.

When the aircraft reaches an altitude of 100 feet, balanced relay 264 closes contacts 264a and 264c, thus energizing relay 425, FIGURE 7. Signal lamp 436 and relay 250 are now energized through relay contacts 425a and 425c. Relay contacts 250a and 250b, FIGURE 5, open to unground the input to amplifier 273. Relay contacts 250e and 250d, FIGURE 6, open to unground the input to summation point 336 through resistor 351. Relay contacts 250g and 250j close to supply an input to summation point 336 through resistor 367. Relay contacts 250k and 250m, FIGURE 7, close to complete a holding circuit for relay 250. Relay contacts 250n and 250q close to complete a preparatory circuit for relay 271. Relay contacts 250r and 250s, FIGURE 6, open to convert the circuit including amplifier 377 from a simple amplifier to an integrator. Relay contacts 250u, 250v, and 250w operate to disconnect conductors 35 and 36 and instead connect conductor 36 to slider 382, thus supplying an initial output sufficient to cause glide of the aircraft at 2½°.

It will be obvious that once relay 250 has pulled in and completed its holding circuit, operation of relay 426 to energize relay 432 is without effect on the system.

Because of the action of capacitor 240 the input to amplifier 273 is now proportional with negligible error to the rate of change of the voltage from slider 214, that is, to the rate of descent $\dot{h}$ of the aircraft, and sliders 256, 275, and 276 are displaced from their original positions in proportion thereto. The previous operation of the glide slope coupler has established an elevator position for the aircraft which results in descent at a constant rate, for which condition the signal on slider 276 is constant at a negative value which may represent, for example, 10 feet per second of descent. Slider 352 is set by manual knob 356 so that it is at a positive potential, with respect to ground, of the same magnitude as the desired voltage on slider 276.

Slider 370 is adjustable by knob 373 to vary the asymptote of the flare-out curve. A study of FIGURE 1 will make it clear that the lines are asymptotic to the line $h=0$, and that an aircraft can float along at an elevation of a few inches for a considerable time. If the curve is replotted to be asymptotic to $h=-1$, for example, touchdown impact is slightly more severe, but runway economy results in that the possibility of undesirable floating in the presence of head winds is eliminated. This is the function of slider 370, which is displaced along winding 372 to give a signal to summation point 336 which has the effect of making the flare-out curves asymptotic to a value other than zero.

As a result of the foregoing the input to amplifier 377 comprises the signal on slider 276 compared with that from sliders 352 and 370. If these signals are equal no input is supplied to the amplifier, motor 380 does not operate, slider 381 is at zero potential with respect to ground, and slider 382 supplies an output which is the same as that from slider 170 in the glide path coupler of FIGURE 3. No operation of motor 380 results. In any other condition, there is an input to amplifier 377, motor 380 operates to supply a rebalance signal through resistor 335 which is proportional to the time integral of the unbalance signal, and slider 382 is displaced to modify the output on conductor 36. Operation of motor 380 continues as long as the input signals are not balanced, continuously adjusting sliders 381 and 382 at a slow rate so that the aircraft is returned to a condition in which it descends at a rate determined by the setting of slider 352.

It is obvious that in this, the "dead reckoning" phase of the descent, all the main computer components are in operation. Any serious defect in the computer must result in immediate improper operation of the aircraft, which the human pilot can detect. If this should happen, switch 414 is opened and manual glide path following is performed. The system is thus given failsafe properties.

As the aircraft continues to descend at the rate determined by slider 352, it reaches an altitude of 40 feet. Here balanced relay 263 operates, energizing relay 423. Relay contacts 423a and 423c complete the energizing circuit for relay 271, which pulls in. In FIGURE 6 relay contacts 271a, 271b, and 271c act to disconnect amplifier 377 from slider 352 and connect it to slider 214, substituting for the fixed voltage a voltage which varies with altitude. Relay contacts 271d and 271e open to unshunt resistor 333. Relay contacts 271g, 271h and 271j act to unground summing resistor 339 and to connect it to slider 344 and hence to slider 256. Relay contacts 271k and 271m, FIGURE 7, close to energize signal lamp 444, and relay contacts 271n and 271q close to complete the holding circuit for relay 271.

Slider 256 has been displaced from its initial position by an amount determined by the extent of operation of motor 274, that is, in proportion to the rate of descent of the aircraft. The voltage on winding 254 is proportional to the actual elevation of the aircraft, since the ends of the winding are connected to slider 213 and 214. The voltage between slider 256 and ground is accordingly proportional to the product of altitude and altitude rate, that is, to $h\dot{h}$. The altitude $h$ is always positive, but the altitude rate $\dot{h}$ may be either positive or negative. To make possible either sign of the product positive and negative values of $h$ are used, and the somewhat more difficult problem of representing negative rate by slider 256 is avoided.

The inputs to amplifier 377 now comprise the asymptote signal through resistor 367, an altitude signal through resistor 351, an altitude rate signal through resistor 341, and a product signal through resistor 339. These signals add up to zero only when the aircraft is on the flare-out course 26 of FIGURE 1: for all other positions of the aircraft an input is supplied to amplifier 377, operation of motor 380 takes place, the output on slider of 382 is varied, and a feedback signal is supplied through resistor 335.

This output is sufficient in magnitude and suitable in sense to cause return of the aircraft to the desired exponential curve.

If the operator wishes to follow the simple flare-out path shown by curve 21, of FIGURE 1, switches 320, 321, and 322 of FIGURE 6 are thrown to their counter clockwise positions. This grounds out the product input, changes the gain of the rate of descent input, and modifies the feedback circuit for amplifier 377, and operation according to curve 21 results.

Figure 4:
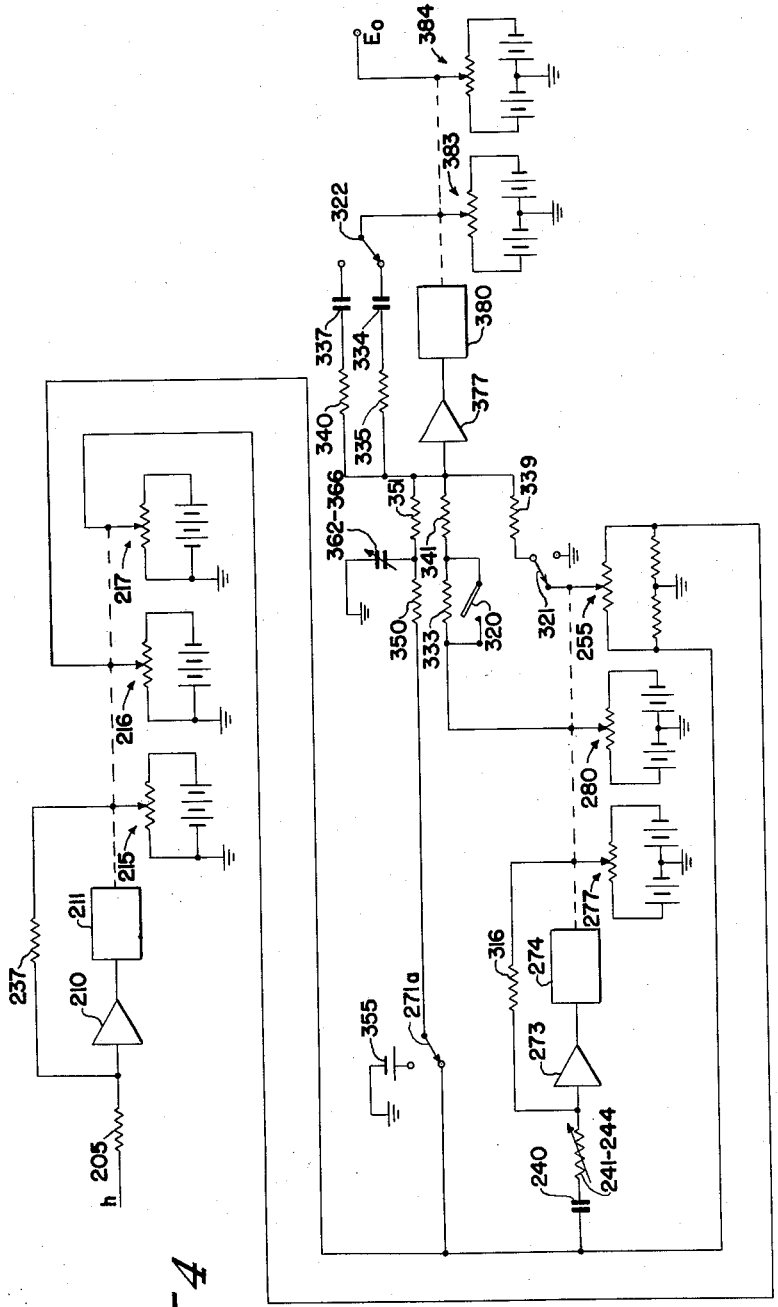
FIGURE 4 is a showing of the flare-out computer in simplified form for consideration as a servo system.

In order to describe the flare-out computer in servo terminology, the equipment of FIGURES 5 and 6 has been simplified in FIGURE 4, the same reference numerals being used. With switches 320, 321 and 322 thrown to positions opposite to those shown, the system has an equation of the form $$e_0(t) = 0.2[h(t) + 4\dot{h}(t)] + 0.3\int[h(t) + 4\dot{h}(t)]dt \quad (1)$$

This equation may be rewritten in operational form in the complex frequency domain, neglecting initial conditions, as $$E_0(s) = 0.2[H(s) + 4sH(s)] + \frac{0.3}{s}[H(s) + 4sH(s)] \quad (2)$$

or $$E_0(s) = \left(0.2 + \frac{0.3}{s}\right)[H(s) + 4sH(s)] \quad (3)$$

Filters on $H(s)$ and $sH(s)$ are provided, and the final equation is accordingly modified to $$E_0(s) = \left(0.2 + \frac{0.3}{s}\right)\frac{H(s)}{1+T_1s} + \left(0.2 + \frac{0.3}{s}\right)\frac{4sH(s)}{1+T_2s} \quad (4)$$

The first term of this equation is supplied through resistor 351, and the second term through resistor 341.

If it is desired to follow curve 26 of FIGURE 1, switches 320, 321, and 322 are thrown to the position shown in FIGURE 4. It can now be shown that $$E_0(s) = \left(0.3 + \frac{0.6}{s}\right)\frac{H(s)}{1+T_1s}$$
$$+ \left(0.3 + \frac{0.6}{s}\right)\frac{2sH(s)}{1+T_2s} + \left(0.3 + \frac{0.6}{s}\right)\frac{1}{13}\mathscr{L}[h(t)h_2(t)] \quad (5)$$

where $$h_2(t) = \mathscr{L}^{-1}\left[\frac{sH(s)}{1+T_2s}\right] \quad (6)$$

The first term of Equation 5 is supplied through resistor 351, the second through resistor 341, and the third through resistor 343.

Whether described in terms of actual physical components or of their abstract servo equivalent, it will be understood that we have disclosed herein a new flare-out computer and an improved automatic landing system incorporating the computer, and providing means for preventing initiation of the computer control until the aircraft is sufficiently near the glide path for automatic initiation of a dead reckoning control period and a flare-out control period at suitable altitudes, and for computing an optimum flare-out path.

Numerous objects and advantages of our invention have been set forth in the foregoing description, together with details of the structure and function of the invention, and the novel features thereof are pointed out in the appended claims. The disclosure, however, is illustrative only, and we may make changes in detail, especially in matters of shape, size, and arrangement of parts, within the principle of the invention, to the full extent indicated by the broad general meaning of the terms in which the appended claims are expressed.

We claim as our invention:

1. In combination: a signal responsive condition controller; means giving a first signal representative of the extent of departure of the condition from a desired schedule; means giving a second signal having at least a component determined by the product of the actual value of the condition multiplied by its rate of change; means normally supplying said first signal to said controller to maintain said condition at the scheduled value thereof; means operable to disable the first named signal means and simultaneously fix said condition controller at whatever adjustment it then has; and further means operable to supply said second signal to said controller and to release said controller so that the condition is adjusted at least in part in accordance with said product.

2. In combination: a signal responsive condition controller; means giving a first signal representative of the extent of departure of the condition from a desired schedule; means giving a second signal having at least a component determined by the product of the actual value of the condition multiplied by its rate of change; means normally supplying said first signal to said controller to maintain said condition at the scheduled value thereof; and further means operable to supply said second signal to said controller so that the condition is adjusted at least in part in accordance with said product.

3. In combination: a signal responsive condition controller; means giving a first signal representative of the extent of departure of the condition from a desired schedule; means giving a second signal having at least a component determined by the product of the condition multiplied by its rate of change; means normally supplying said first signal to said controller to maintain said condition at the scheduled value thereof; means operable to disable the first named signal means and simultaneously fix said condition controller at whatever adjustment it then has; and further means operable to supply said second signal to said controller and to release said controller, so that the condition is adjusted at least in part in accordance with said product.

4. In combination: a signal responsive condition controller; means giving a first signal representative of the extent of departure of the condition from a desired schedule; means giving a second signal having at least a component determined by the product of the condition multiplied by its rate of change; means normally supplying said first signal to said controller to maintain said condition at the scheduled value thereof; and further means operable to supply said second signal to said controller so that the condition is adjusted at least in part in accordance with said product.

5. Control apparatus comprising, in combination: means giving a first signal representative of the extent of departure of a condition from a program in which it passes through first and second values in sequence; means normally adjusted to control said condition in response to said signal, so as to establish a control adjustment; means operative when said condition reaches said first value for disabling said first named means, and for arbitrarily maintaining said control adjustment at its then existing value, so that said condition approaches said second value; means giving a second signal having at least a component determined by the product of the actual value of said condition multiplied by the rate of change thereof; and means made effective when said condition reaches said second value to control said condition in accordance with said second signal.

6. Control apparatus comprising, in combination, means giving a first signal representative of the extent of departure of a condition from a program in which it passes through first and second values in sequence; means normally adjusted to control said condition in response to said signal, so as to establish a control adjustment; means operative when said condition reaches said first value for disabling said first named means, and for arbitrarily maintaining said control adjustment at its then existing value so that said condition approaches said second value; means giving a second signal having at least a component determined by the product of the actual value said condition multiplied by the rate of change thereof; means made effective when said condition reaches said second value to control said condition in accordance with said second signal; and means preventing operation of said last named means whenever the value of said condition goes beyond a selected limit.

7. Control apparatus comprising, in combination: means giving a first signal representative of the extent of departure of a condition from a program in which it passes through first and second values in sequence; means normally adjusted to control said condition in response to said signal so as to establish a control adjustment thereof; means operative when said condition reaches said first value for disabling said first named means, and for arbitrarily maintaining said control adjustment at its then existing value so that said condition approaches said second value; means giving a second signal having at least a component determined by the product of the actual value of said condition multiplied by the rate of change thereof; means made effective when said condition reaches said second value to control said condition in accordance with said second signal; and means preventing operation of said last named means whenever the value of said condition goes beyond a selected limit.

8. In combination: means giving a first output determined by the departure of an aircraft from a sloping glide path; means giving a second output which is a function of the altitude of the aircraft and its rate of change, said function comprising at least the product of said altitude and said rate; signal responsive means for controlling the pitch attitude of the aircraft; means normally connecting the first named means so that said first output comprises an input to the last named means; and altitude responsive means for disconnecting said first named means from said last named means, and for connecting the second named means thereto, so that said second comprises an input to said last named means.

9. The invention of claim 7 and means preventing operation of said last named means whenever said first output exceeds a selected value.

10. Control apparatus comprising, in combination: means giving a first signal representative of the extent of departure of a condition from a program; means normally adjusted to control said process in accordance with said first signal, so as to establish a control adjustment thereof; means operative when said condition reaches a first value for disabling said first named means, and for arbitrarily maintaining said control adjustment until said condition reaches a second value; means giving a second signal having at least a component determined by the product of the actual value of said condition multiplied by the rate of change thereof; and means made effective when said condition reaches said second value to control said condition in accordance with said second signal.

11. Apparatus for controlling an aircraft in elevation comprising, in combination: means giving a first signal determined by the departure of the aircraft from a radio glide path; computing means giving a second signal which is a function of the altitude of the aircraft and the rate of change thereof, said function including as at least a component thereof the product of said altitude multiplied by said rate of change; overridable control means normally stabilizing the pitch attitude of the aircraft; means initially overriding said control means in accordance with said first signal; and altitude responsive means for substituting said second signal for said first signal in overriding said control means.

12. Apparatus for controlling an aircraft in elevation comprising, in combination: means giving a first signal determined by the departure of the aircraft from a radio glide path; computing means giving a second signal which is a function of the altitude of the aircraft and the rate of change thereof, said function including as at least a component thereof the product of said altitude and rate of change; overridable control means normally stabilizing the pitch attitude of the aircraft; means initially overriding said control means in accordance with said first signal; first altitude responsive means operative to cut off said first signal from said control means and causing the latter to continue stabilizing the pitch attitude of the aircraft at that then prevailing; and second altitude responsive means for substituting said second signal for said first signal in overriding said control means.

13. The invention of claim 11 together with means for preventing operation of said altitude responsive means if the aircraft is displaced from said beam by more than a predetermined amount.

14. A flare-out computer comprising a first servo system giving signals representative of the altitude of an aircraft; a second servo system giving signals representative of the rate of change of altitude; means giving a signal representative of the product of said altitude multiplied by said rate, and means connected to receive said signals for giving an output having at least a component determined by said product.

15. The invention of claim 14 together with means connected to receive said signals for giving an output having components representative of said signals.

16. A flare-out computer comprising a servo system giving signals representative of the altitude of an aircraft; a second servo system giving signals representative of the rate of change of altitude; means giving a signal representative of the product of said altitude multiplied by said rate, and means connected to receive said signals for giving an output having at least a component determined by said product and a component determined by the time integral of said product.

17. A flare-out computer comprising a servo system giving signals representative of the altitude of an aircraft; a second servo system giving signals representative of the rate of change of altitude; means giving a signal representative of the product of said altitude multiplied by said rate, and means connected to receive said signals for giving an output having components representative of said signals and components determined by the time integral thereof.

18. Apparatus for controlling an aircraft comprising, in combination: means giving a first signal determined by the departure of the aircraft from a radio path; computing means giving a second signal which is a function of the displacement of the aircraft from a datum and the rate of change thereof, said function including as at least a component thereof the product of said displacement and said rate of change; overridable control means normally stabilizing the pitch attitude of the aircraft; means initially overriding said control means in accordance with said first signal; and altitude responsive means for substituting said second signal for said first signal in overriding said control means.

19. In combination: signal responsive means operative to govern the pitch attitude of an aircraft to determine its path in elevation; means for giving a first signal determined by the displacement of the aircraft from a desired sloping path; means giving a first output determined by the altitude of the aircraft; means giving a second output which varies with the rate of change of the aircraft; means giving a second signal having a component which varies with the product of said first and second outputs; and connecting means supplying said first and second signals to said signal responsive means for causing operation thereof.

20. In combination: signal responsive means operative to govern the pitch attitude of an aircraft to determine its path in elevation; means giving a first output determined by the altitude of the aircraft; means giving a second output which varies with the rate of change of the aircraft; means giving a signal having a component which varies with the product of said first and second outputs; and connecting means supplying said signal to said signal responsive means for causing operation thereof.

21. Aircraft control apparatus comprising, in combination: means giving a signal representative of the altitude of the aircraft; means giving a signal representative of the rate of change of altitude of the aircraft; means connected to receive said signals for giving an output representative of their product; and means connected to receive said output for varying the pitch attitude of the aircraft in accordance therewith.

References Cited in the file of this patent

UNITED STATES PATENTS

| | | |
|---|---|---|
| 2,348,238 | Beeke et al. | May 9, 1944 |
| 2,506,998 | Dehmel | May 9, 1950 |
| 2,841,345 | Halpert et al. | July 1, 1958 |

OTHER REFERENCES

"Electronic Analog Computers" (2nd Edition), by Korn and Korn (see Sections 2.8, 2.9, and 6.9), McGraw-Hill Book Company (pages 53–58 and 313–321).